Figure 1:
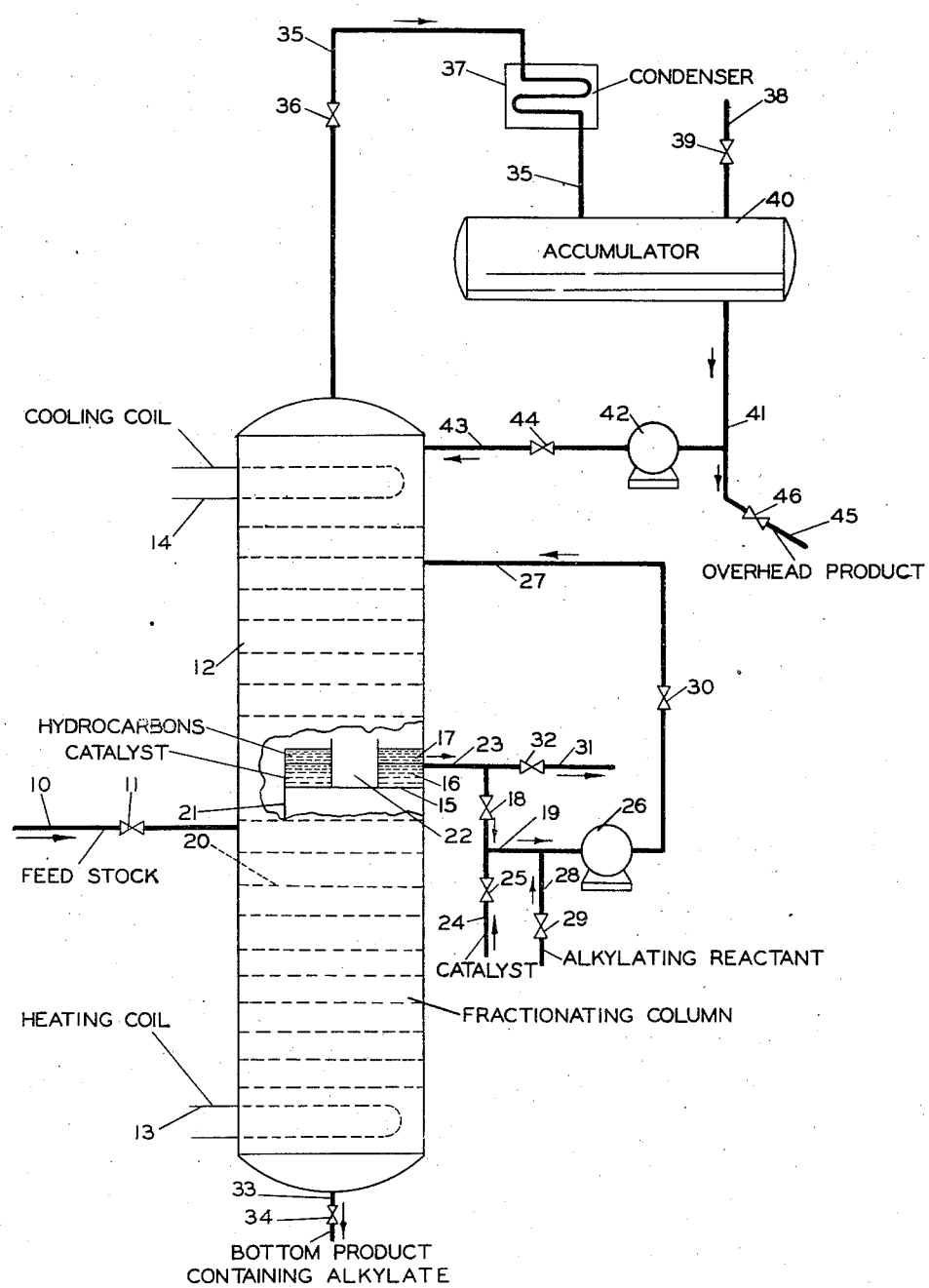

Dec. 19, 1944.　　　　L. G. MOLIQUE　　　　2,365,426
HYDROCARBON CONVERSION PROCESS
Filed March 28, 1942　　2 Sheets-Sheet 2

INVENTOR
L. G. MOLIQUE
BY Hudson, Young & Yinger
ATTORNEYS

Patented Dec. 19, 1944

2,365,426

UNITED STATES PATENT OFFICE 2,365,426

HYDROCARBON CONVERSION PROCESS

Lawrence G. Molique, Bartlesville, Okla., assignor to Phillips Petroleum Company, a corporation of Delaware Application March 28, 1942, Serial No. 436,651

4 Claims. (Cl. 260—683.4)

This invention relates to the catalytic conversion of low-boiling hydrocarbons to produce other hydrocarbons. More particularly it relates to the catalytic conversion of low-boiling hydrocarbons to higher boiling hydrocarbons and especially hydrocarbons suitable for inclusion in motor fuel. In a more specific sense this invention is concerned with a fractionation of a C₄ mixture and the conversion of certain hydrocarbons concentrated by the fractionation to higher boiling hydrocarbons in the fractionating means, such as a fractionating or rectification column, in such a manner that the conversion will occur at that position in the column where the concentration of the hydrocarbons is favorable for the desired chemical reaction. In a still more specific aspect, it relates to the alkylation of isobutane with butenes to produce isooctanes boiling in the motor fuel range, using a liquid nonvolatile catalyst.

When it is desirable to conduct certain polymerization reactions and especially catalytic polymerization reactions to produce motor fuels of relatively high octane number, conventional manufacturing procedure requires that various reactants be within limited ranges of concentration. For instance, in the catalytic alkylation reaction of an isoparaffin with an olefin, commercial success of the reaction depends on, among other variables, the relative concentration of the isoparaffin and the olefin, both with respect to each other and with respect to other hydrocarbons which may be present. It has been reported by various investigators that a desirable molal ratio of isoparaffin to olefin is on the order of 5 to 1 and in some cases should be as high as 50 or 100 to 1, or more. At least, it seems to be definitely established that the concentration of isobutane must be somewhat greater than of the butenes in order to favor the alkylation reaction and retard the polymerization of the butenes with each other. In situations where a feed stock contains substantial amounts of both isoparaffins and of olefins or even, perhaps, an excess of olefins, and it is desirable to alkylate isoparaffins with at least a portion of the olefins with little or no polymerization of the olefinic material, it has heretofore been necessary to carry out preliminary steps on the feed stock in order that the charge to a chamber in which the catalytic alkylation is conducted will contain an excess of isoparaffins as compared to the amount of olefinic material present. In other situations where feed stock for a catalytic alkylation reaction contains small amounts of the isoparaffin and relatively large amounts of diluent material, such as a less readily alkylatable normal paraffin, conventional procedure usually includes the step of treating such a feed stock to separate an isoparaffin fraction from a normal paraffin fraction and subsequently passing an isoparaffin fraction so separated to an alkylation step for conversion.

I have now found that a mixture of hydrocarbon material which does not have a satisfactory composition for a subsequent direct conversion of a part or all of its constituents in a conventional alkylation unit can be charged to a novel, combined fractionating-reaction unit and treated therein so that the desired conversion will take place in said unit. In one modification of my invention I have found an improved method of catalytically alkylating a normally gaseous isoparaffin, usually isobutane, with an olefin or other suitable alkylating reactant, usually a butene, when said normally gaseous isoparaffin is contained in a feed stock that also contains undesirably large amounts of a corresponding normal paraffin or other less reactive alkylatable material and/or some substantially inert material. Such feed stock for an alkylation process is treated according to my invention by passing it to a novel fractionating-reaction unit wherein it is so treated that within the limits of a predetermined zone in the unit an isoparaffin hydrocarbon will be present in a higher concentration in the liquid phase than in the incoming feed stock, such higher concentration of isoparaffin being favorable for its catalytic alkylation. In this way, the catalytic alkylation of such an isoparaffin is conducted in said predetermined zone in the fractionating-reaction unit. The olefin or other alkylating reactant may or may not be associated with the isoparaffin in the original feed stock. In another specific modification of my invention a feed stock, which contains several species of hydrocarbons having between two and five carbon atoms per molecule which are capable of being polymerized but which are present therein in such concentrations that a desired polymerization reaction can not be produced with favorable results, is passed to a fractionating column and therein separated so that in a certain portion of the column the concentration of the desired polymerizable constituents will be favorable for the polymerization of said constituents and furthermore that the polymerization reaction can be conducted in said portion of the column.

In its broadest scope my invention will find application when it is desirable to react volatilizable constituents of a feed stock which are contained therein in undesirable concentrations, such as concentrations which will not permit favorable and/or optimum results or which tend to inhibit or repress the desired reaction. The use of a fractionating-reaction unit for such reactions allows product to be withdrawn immediately and continuously from the reaction zone and also permits the immediate return of unused reactants to the reaction zone when optimum conditions of temperature and concentration are maintained.

It is an object of this invention to convert low-boiling hydrocarbons to higher-boiling hydrocarbons.

It is another object of this invention to polymerize certain low-boiling hydrocarbons to produce higher boiling hydrocarbons.

It is still another object of this invention to produce hydrocarbons suitable for motor fuel by the catalytic alkylation of paraffin hydrocarbons from a feed stock in which said paraffin hydrocarbons do not have a suitable concentration to provide optimum conversion.

It is still another object to produce hydrocarbons boiling in the motor fuel range from lower boiling hydrocarbons.

Other objects and advantages will be readily apparent from the accompanying disclosure and discussion.

Figure 2:
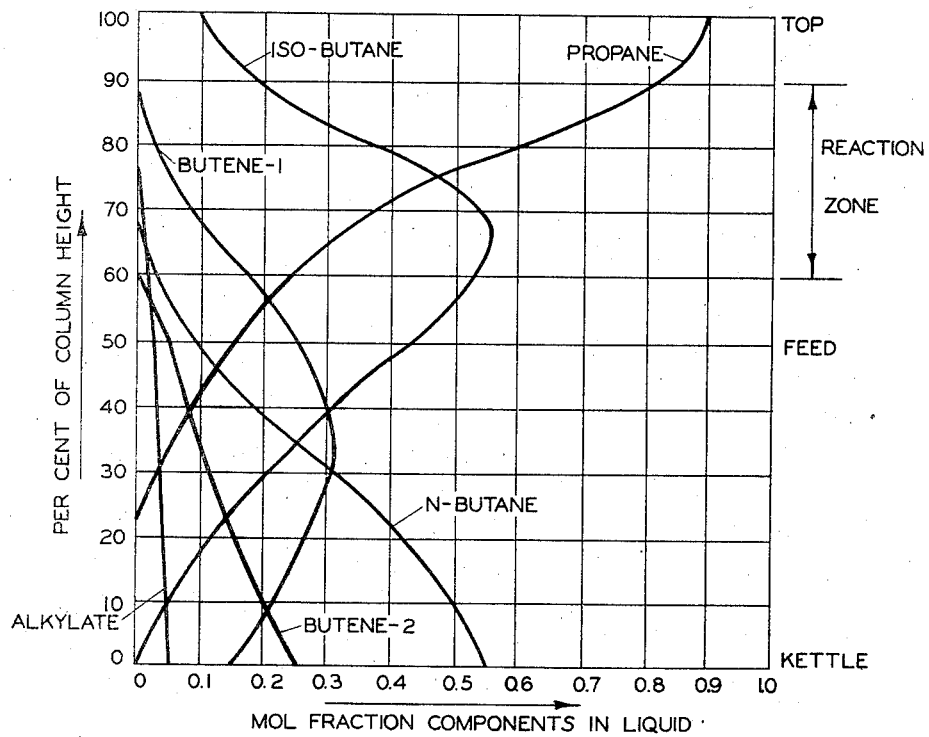

My invention will now be described, in connection with the drawings which form a part of this specification and in which Fig. 1 illustrates diagrammatically a fractionating-reaction column, in section, together with accompanying equipment for operating a process, in connection with one modification of my invention which pertains to the alkylation of isobutane, and Fig. 2 shows diagrammatically the liquid compositions throughout the fractionating-reaction column of Fig. 1.

Referring now to Fig. 1, a feed stock comprising mainly hydrocarbons containing four carbon atoms per molecule is passed through conduit 10 controlled by valve 11 to a fractionating-reaction column 12. This feed stock may be a predominantly C4 fraction separated from the effluent of a cracking still and as such will contain in addition to isobutane a large quantity of normal butane, some butenes and some propane. The molal ratio of normal butane to isobutane in such a feed stock is generally so high that such a stock is unsuitable for charging directly to a reaction zone of alkylation of the isobutane contained therein. The molal ratio of isobutane to butenes in such a stock is likewise frequently too low for satisfactory results. Such a feed stock is treated in the fractionating-reaction column 12 in such a manner that the isobutane will be in greatest concentration in the liquid phase in a predetermined upper portion of the column. I have found that in the fractionating column each component of the feed stock charged thereto reaches a maximum concentration in the liquid phase in that portion of the column where the temperature corresponds to the boiling point of that component at the operating pressure and that the optimum ratio of isobutane to butene is obtained at a point which is at least 60% of the height of the column.

A trap-out tray 15 is provided within the column at or just below a position at which the isobutane will be at optimum concentration in the liquid phase for the desired reaction. This portion is readily predetermined, by one skilled in the art, from a knowledge of the composition of feed stock and by a suitable design of the column and control of the operating conditions. The column 12 is equipped with heating and condensing means 13 and 14, respectively, as well as the conventional bubble trays 20 in order to assist in the fractionation of the constituents therein. It is to be appreciated, however, that cooling means 14 may be omitted when direct cooling, such as by a reflux liquid, is used, or may be used in cooperation with such operation. Somewhat more removal of heat is necessary than is usual in fractional distillation, due to the heat evolved by the alkylation reaction.

Tray-out tray 15 is so constructed and conditions within the column are so controlled that isobutane collected on this tray, or on trays immediately above this tray, can be alkylated thereon with an alkylating reactant in the presence of a suitable liquid alkylation catalyst whose boiling point or decomposition temperature, under the operating conditions, is appreciably higher than the temperature existing at trap-out tray 15, so that it is substantially a non-volatile liquid under these conditions.

A liquid catalyst suitable for the desired alkylation and substantially immiscible with hydrocarbon material trapped on tray 15 enters the system through conduit 24 controlled by valve 25 and is passed through conduit 19 by means of pump 26 and through conduit 27 controlled by valve 30 and enters the fractionating column 12 at a desired point above tray 15, being intimately admixed or even emulsified with the liquid hydrocarbon material present at the point of introduction. Emulsifying agents may be added, if desired. The catalyst thus flows downward and countercurrent to hydrocarbon vapors within the column and contacts hydrocarbon liquid condensed above tray 15 and is finally trapped on tray 15 as liquid phase 16 together with higher boiling hydrocarbons as phase 17.

Material for alkylating isobutane in the column may be admitted to the column with the incoming feed stock through conduit 10, as when the charge is from a cracking unit and/or through conduit 27 in admixture with alkylation catalyst, as when the charge through conduit 10 contains little or no unsaturates, as will be the case when a butane fraction from a natural gasoline plant or from an isomerization unit is the charge stock. Such material can be admitted to the catalyst stream through conduit 28 controlled by valve 29. However, when the sole charge of material for alkylating isobutane is in the feed stock along with isobutane admitted through conduit 10, trap-out tray 15 is so positioned within the column and conditions are so controlled that the concentration of reactants between tray 15 and the inlet to the column for catalyst are favorable and/or optimum for the desired alkylation. In such a modification the concentration of both the alkylatable material and the alkylating reactant are satisfactorily controlled by my process. Conditions within the column are such that material above tray 15 which is contacted with catalyst undergoes conversion and converted material together with catalyst and unconverted material is trapped out on tray 15. It is preferable to position conduit 27, which carries catalyst to the fractionating column, in such a manner that within the zone between the inlet of conduit 27 and trap-out tray 15 a major portion of the desired reaction occurs. Although a portion of the reaction occurs within the mixture trapped on tray 15 it is desirable to have a major part of this reaction take place above this tray, thereby allowing tray 15 to act as a settling or phase separating means.

Trap-out tray 15 does not extend completely across the column, a downcomer with weir 21 being provided to allow overflow of the hydrocarbons from phase 17 into the next lower tray. A chimney 22 is provided in the middle of trap-out tray 15 to allow vapor to rise therethrough.

Not all of the vaporous material passing up through vapor riser or chimney 22 is condensed in the upper portion of the column and that which is not condensed and which may contain some isobutane as well as lower boiling material, passes through conduit 35 controlled by valve 36 to cooler and reflux condenser 37 and thence to accumulator 40. The temperature in condenser 37 is so regulated that substantially all reactant material passed therethrough will condense. From accumulator 40 liquid material is passed through conduit 41 by pump 42 and then through conduit 43 controlled by valve 44 as reflux liquid to the top of fractionating column 12. When desirable, a portion of the liquid material from accumulator 40 may be removed from the process through conduit 45 controlled by valve 46. Also, when a mixture of vapor and liquid is discharged from condenser 37 through conduit 35 and into accumulator 40, vapor may be removed from the system through conduit 38 controlled by valve 39.

Spent or partially spent catalyst is passed from tray 15 in the fractionating column by means of pump 26 through conduit 23 controlled by valve 18 and at least a portion is recirculated through conduit 27 controlled by valve 30 to the reaction zone in the column. If desired, a portion of the spent or partially spent catalyst may be removed from the system through conduit 31 controlled by valve 32. Spent catalyst so removed can be revivified and/or regenerated in means not shown and returned to the alkylation zone through conduit 24. When the phase separation on trap-out tray 15 is not as clean-cut as is desirable and partially spent catalyst removed through conduit 23 is, therefore, contaminated with a substantial amount of hydrocarbon material, the material removed through conduit 31 may be subjected to additional phase separation outside of the fractionating-reaction unit in means not shown. Partially spent catalyst so separated may be subsequently revivified and/or regenerated. Likewise, liquid hydrocarbon material overflowing trap-out tray 15 may contain small amounts of catalyst in suspension, and can be freed therefrom in auxiliary equipment, not shown.

Hydrocarbons synthesized in the process as well as any material higher boiling than the reactant material together with some unreacted feed stock pass down through the column in liquid phase and are removed from the column through conduit 33 controlled by valve 34. When the material removed through conduit 33 contains appreciable amounts of catalytic material in solution and/or mechanically carried over from tray 15, a subsequent separation is necessary for removing said catalytic material from such hydrocarbons. Generally such catalytic material is returned to the reaction zone as by means of conduit 24. The hydrocarbons material can then be treated as appears desirable.

Alkylating agents for reaction with the paraffin to be alkylated include normally gaseous olefins, olefin polymers, alcohols, alkyl halides. Similar reactions take pace with aryl halides and aralkyl halides. No one agent, however, is to be considered an equivalent of any other agent. Any such material, when volatile, may be associated with the isoparaffin in the feed stock charged through conduit 10, or whether volatile or non-volatile, may be admitted to the column in admixture with the alkylation catalyst through conduit 27.

Referring now to Fig. 2, there is shown, in graphical form, the concentrations of hydrocarbon components in the liquids on the bubble-trays throughout the column 12 of Fig. 1 during a typical operation in accordance with my invention.

The charge to fractionating-reaction column 12 of this example is a $C_4$ mixture from the gases of a cracking still, and has a composition as follows:

| | Molal per cent |
|---|---|
| Propane | 8.0 |
| Normal butane | 43.0 |
| Isobutane | 7.0 |
| 1-butene | 12.0 |
| 2-butene | 30.0 |
| Isobutene | 0.0 |
| | 100.0 |

This charge is passed through conduit 10 at about the midpoint of the column 12. The reflux ratio used was 15 parts of reflux to 1 part of overhead product. It will be seen from an inspection of Fig. 2 that there is obtained a concomitant concentration of isobutane and an establishment of a high ratio of isobutane to butenes, both of which factors are to be desired in an alkylation process. It is at the bottom of, or just below, the region marked "Reaction zone" that the trap-out tray 15 is located, and the alkylation catalyst, in this instance concentrated sulfuric acid, is introduced at a desired point in the upper part of this zone.

From the foregoing it will be seen that my invention involves the passage to a fractionating column of a feed which is undesirably high in normal butane and in which the molal ratio of isobutane to butenes is above the optimum, maintaining therein such conditions that at a point in the column equal to at least 60% of the height thereof there is established a markedly favorable molal ratio of isobutane to butenes and a 3% desirably low concentration of normal butane, and carrying out the alkylating reaction above that level. The favorable reaction zone may extend from the 60% point to the 90% point but may terminate at the 70 or 75% point in the column. The termination point may be determined by the point of introduction of the catalyst. However the catalyst may be introduced above the top of the reaction zone, descending thereinto.

Higher reflux ratios than that given in the example give even better results. Thus, in addition to control by temperature and pressure, the fractionating conditions may additionally be controlled by controlling the reflux ratio. For different reflux ratios the curves of Fig. 2 would not apply.

Alternatively the column may be operated with no overhead whatever, simply as a rectifying column. Again the curves of Fig. 2 would not apply to such operation because they were determined for a reflux ratio of 15 to 1.

I have described my invention specifically in connection with the alkylation of isobutane but it is to be considered within the scope of this invention to promote the catalytic alkylation of any alkylatable hydrocarbon by my process. Such hydrocarbons may include, for example, propane, normal and isobutane, isopentane, and certain hexanes, but generally isobutane or isopentane will be the paraffin treated. As a suitable catalyst for the alkylation of hydrocarbons I prefer to employ a material which is liquid and preferably, although not necessarily, immiscible under the operating conditions in the zone of reaction and which will promote the desired alkylation. Sulfuric acid, phosphoric acid or mixtures of each of these acids with certain promoting agents, as are well known in the art, are suitable alkylation catalysts. Besides such acid catalysts I may employ any alkylation catalyst which is adapted to being recirculated to and from the conversion zone, and will be relatively involatile under the reaction conditions.

Favorable control of concentration of reactants, when the temperature of the inlet stream is held substantially constant, can be obtained by controlling the operating pressure of the fractionating column and when the pressure is held substantially constant, by employing refrigeration or other means of cooling, either directly or indirectly, and heating of the kettle.

Although my invention has been described in detail in connection with the alkylation of isoparaffin hydrocarbons and specifically isobutane, it is to be appreciated that other hydrocarbon reactions besides alkylation reactions can be conducted according to my process. For example, when it is desirable to copolymerize propene and a butene, such as isobutene, which are contained in a hydrocarbon fraction in more or less equimolecular proportions together with other hydrocarbons having two, three, and four carbon atoms per molecule, my process will find particular application. Referring to the drawings, such a hydrocarbon mixture is passed through conduit 10 to the fractionating column 12. In order to bring about the copolymerization of propene and isobutene satisfactorily with a minimum amount of simple polymerization of isobutene, it is necessary that there be a substantial excess of propene relative to the isobutene in the reaction mixture. This is accomplished in my process by adjusting the conditions within fractionating column 12 in such a manner that the liquid hydrocarbon material within the column and between tray 15 and the inlet to the column for catalyst will have the desired composition for bringing about the desired copolymerization. The copolymerization of propene and isobutene is then produced on and above tray 15 by a suitable polymerization catalyst which is admitted to fractionating column through conduit 27. Operation of the column for this reaction is similar to those described herein for an alkylation reaction.

My process may also be applied to the polymerization of the olefin or diolefin content of a hydrocarbon feed by carrying out the polymerization in the zone of the column where the concentration is at an optimum. Thus even though the olefin or diolefin content of the feed be too low for effective polymerization, polymerization thereof may be readily effected in this way, the polymer being high boiling and descending in the column. Also my process is applicable to other processes such as isomerization, dehydrogenation, hydrogenation, condensation, etc. If the product formed is lighter it may be removed overhead.

My process may also be carried out with a solid catalyst such as a slurry in a suitable medium, or other form of mobile catalyst.

While I have shown a single-section column, the fractionating column may if desired be split into two or more sections arranged in series and so operated that the maximum isobutane concentration occurs in the kettle or accumulator which is at an intermediate position in the total fractionating column. In such an arrangement the acid catalyst would be introduced in that section containing the kettle referred to and withdrawn from the lower part of the kettle or accumulator. The gases from the top of a preceding section are fed to the bottom of a succeeding section and the liquid or condensate from the bottom of a succeeding section is returned to the top of the preceding section as reflux. In this way still more satisfactory compensation for the effects of reactant and catalyst addition and the thermal changes accompanying the reaction may be obtained. In this way the effect of the conversion process upon the over-all operation of the fractionating column is minimized.

Having thus described a specific embodiment, it is understood that my invention embraces such other variations and modifications as come within the spirit and scope thereof and that it is not my intention to unnecessarily limit my invention to the specific reaction discussed.

I claim:

1. A process for producing isoparaffins boiling in the motor fuel range from a $C_4$ mixture containing normal butane, isobutane, and normal butenes in molal excess of said isobutane, which comprises passing such a mixture to fractional distillation means at an intermediate portion thereof, concentrating in a zone in an upper portion of said means a hydrocarbon liquid containing a higher concentration of isobutane and a lower concentration of normal butenes than said $C_4$ mixture and having a molal ratio of isobutane to butenes greater than 1:1, intimately admixing with said hydrocarbon liquid in said zone a nonvolatile paraffin alkylation catalyst which is active as an alkylation catalyst under the conditions existing in said zone, to effect an alkylation reaction between said isobutane and butenes forming isoparaffins boiling in the motor fuel range, withdrawing from said zone and said distillation means used alkylation catalyst, and withdrawing as a kettle product of said fractional distillation means a hydrocarbon fraction comprising unreacted normal butenes, normal butane, and isoparaffins boiling in the motor fuel range so produced.

2. A process for alkylating isobutane contained in a hydrocarbon mixture comprising isobutane, normal butane, butenes, and minor amounts of lower-boiling material, said isobutane being present in a molar concentration less than that of normal butane and less than that of butenes, which comprises passing said hydrocarbon mixture to a fractional distillation column at approximately the midpoint thereof, removing from the top of said column said lower-boiling material, concentrating in the upper part of said column a liquid hydrocarbon material comprising isobutane and butenes having a molar excess of isobutane, contacting said liquid hydrocarbon material in said column with an alkylation catalyst under alkylating conditions to form higher-boiling paraffin hydrocarbons, passing higher-boiling paraffins so produced down said column in liquid phase, and removing as a kettle product of said column a liquid hydrocarbon fraction comprising normal butane, unreacted butenes, and said higher-boiling paraffins so produced.

3. The process of claim 1 in which said alkylation catalyst is concentrated sulfuric acid.

4. The process of claim 2 in which said alkylation catalyst is concentrated sulfuric acid.

LAWRENCE G. MOLIQUE.